United States Patent [19]

Tompkins et al.

[11] Patent Number: 5,702,494

[45] Date of Patent: Dec. 30, 1997

[54] AIRBAG FILTER ASSEMBLY AND METHOD OF ASSEMBLY THEREOF

[75] Inventors: Thomas L. Tompkins, Woodbury; Ryan C. Shirk, Mendota Heights, both of Minn.; Steven C. Schroeer, New Richmond, Wis.; Richard P. Merry, White Bear Lake, Minn.; Troy K. Ista, River Falls; Richard L. Bloom, Woodville, both of Wis.

[73] Assignee: Minnesota Mining and Manufacturing Company, St. Paul, Minn.

[21] Appl. No.: 656,841

[22] Filed: Jun. 3, 1996

Related U.S. Application Data

[63] Continuation of Ser. No. 489,082, Jun. 9, 1995, abandoned.

[51] Int. Cl.$^6$ .................. B01D 29/23; B01D 39/20; B01D 46/24

[52] U.S. Cl. .................. 55/498; 55/486; 55/514; 55/520; 55/527; 55/DIG. 5; 210/497.1; 280/739; 280/740

[58] Field of Search ............... 55/498, 512, 514, 55/520, 527, DIG. 5; 210/497.1; 280/736, 739, 740

[56] References Cited

U.S. PATENT DOCUMENTS

| | | | |
|---|---|---|---|
| 2,122,582 | 7/1938 | Norris | 55/520 X |
| 2,341,097 | 2/1944 | Heebink | 183/73 |
| 2,546,230 | 3/1951 | Modigliani | 55/527 X |
| 2,609,320 | 9/1952 | Modigliani | 55/527 X |
| 3,042,216 | 7/1962 | Goldman | 210/494 |
| 3,334,752 | 8/1967 | Matravers | 210/497.1 X |
| 3,356,226 | 12/1967 | Miller, Jr. et al. | 210/497.1 X |
| 3,398,837 | 8/1968 | Adams | 55/520 X |
| 3,526,557 | 9/1970 | Taylor, Jr. | 55/527 X |
| 3,828,934 | 8/1974 | Green et al. | 210/497.1 X |
| 3,843,561 | 10/1974 | Sobel | 252/465 |
| 3,869,267 | 3/1975 | Gaylor | 55/492 |
| 3,920,428 | 11/1975 | Kinsley, Jr. | 55/528 |
| 4,012,211 | 3/1977 | Goetz | 55/485 |
| 4,048,074 | 9/1977 | Bruenemann et al. | 55/520 X |
| 4,264,346 | 4/1981 | Mann | 55/523 |
| 4,276,071 | 6/1981 | Outland | 55/523 |
| 4,324,572 | 4/1982 | Erdmannsdörfer et al. | 55/385 |
| 4,376,637 | 3/1983 | Yang | 55/2 |
| 4,398,931 | 8/1983 | Shevlin | 55/341 R |
| 4,427,418 | 1/1984 | Kogiso et al. | 55/287 |
| 4,456,457 | 6/1984 | Nozawa et al. | 55/283 |
| 4,536,439 | 8/1985 | Forsten | 429/280 |

(List continued on next page.)

FOREIGN PATENT DOCUMENTS

| | | |
|---|---|---|
| 0275372A1 | 1/1990 | European Pat. Off. . |
| 0275372B1 | 1/1990 | European Pat. Off. . |

(List continued on next page.)

OTHER PUBLICATIONS

Sales Brochure entitled "Filter Cartridge Sealing Systems," from Filterite (a Brunswick Company) of Timonium, MD, Bulletin No. 1795, 1979.

Japanese Abstract No. 56–46405 (Sumiyoshi), published Oct. 7, 1982.

(List continued on next page.)

*Primary Examiner*—Robert Spitzer
*Attorney, Agent, or Firm*—Gary L. Griswold; Walter N. Kirn; Harold C. Knecht, III

[57] ABSTRACT

An efficient, light-weight airbag inflation filter includes a gas-permeable, substantially rigid support tube having a plurality of uniform perforations therethrough. A filtering element formed from a continuous inorganic ceramic yarn or roving is helically cross-wound around the support tube to form one or more layers covering the perforations of the support tube. A wire screen, having openings therethrough smaller than the perforations in the support tube, is disposed between the filtering element and the support tube to act as a gas diffusion layer for the gases passing through the inflation filter.

32 Claims, 7 Drawing Sheets

U.S. PATENT DOCUMENTS

| | | | |
|---|---|---|---|
| 4,543,113 | 9/1985 | Forester et al. | 55/378 |
| 4,576,799 | 3/1986 | Wörner et al. | 422/176 |
| 4,613,350 | 9/1986 | Forester et al. | 65/2 |
| 4,660,779 | 4/1987 | Nemesi et al. | 210/497.1 X |
| 4,744,216 | 5/1988 | Rao et al. | 60/303 |
| 4,813,231 | 3/1989 | Bykowski | 60/274 |
| 4,824,566 | 4/1989 | Thibos | 210/497.1 X |
| 4,840,397 | 6/1989 | Katz et al. | 280/739 |
| 4,940,476 | 7/1990 | Buck | 55/486 |
| 4,952,312 | 8/1990 | Zantonelli et al. | 210/497.1 X |
| 5,042,249 | 8/1991 | Ermannsdörfer | 60/299 |
| 5,064,459 | 11/1991 | Unterforsthuber et al. | 55/512 |
| 5,071,161 | 12/1991 | Mahon et al. | 280/739 |
| 5,087,070 | 2/1992 | O'Loughlin et al. | 280/740 |
| 5,100,171 | 3/1992 | Faigle et al. | 280/736 |
| 5,104,727 | 4/1992 | Wnenchak | 428/285 |
| 5,171,341 | 12/1992 | Merry | 55/494 |
| 5,174,968 | 12/1992 | Whittenberger | 422/174 |
| 5,174,969 | 12/1992 | Fischer et al. | 422/180 |
| 5,190,571 | 3/1993 | Fay et al. | 55/323 |
| 5,204,068 | 4/1993 | O'Loughlin et al. | 422/180 |
| 5,215,615 | 6/1993 | Forsythe | 55/527 X |
| 5,215,721 | 6/1993 | Tasaki et al. | 422/165 |
| 5,224,973 | 7/1993 | Hoppenstedt et al. | 55/267 |
| 5,230,726 | 7/1993 | Smith et al. | 55/487 |
| 5,248,481 | 9/1993 | Bloom et al. | 422/171 |
| 5,248,482 | 9/1993 | Bloom et al. | 422/174 |
| 5,258,164 | 11/1993 | Bloom et al. | 422/174 |
| 5,268,013 | 12/1993 | Bruncher et al. | 55/486 |
| 5,298,046 | 3/1994 | Peisert | 55/486 |
| 5,308,370 | 5/1994 | Kraft et al. | 55/498 |
| 5,346,252 | 9/1994 | Levosinski | 280/740 |
| 5,372,380 | 12/1994 | Duffy et al. | 280/740 |
| 5,453,116 | 9/1995 | Fischer et al. | 55/527 X |

FOREIGN PATENT DOCUMENTS

| | | |
|---|---|---|
| 0358522 | 3/1990 | European Pat. Off. |
| 0 468 132 | 1/1992 | European Pat. Off. |
| 0552706A1 | 7/1993 | European Pat. Off. |
| 0570098A2 | 11/1993 | European Pat. Off. |
| 0640515A1 | 3/1995 | European Pat. Off. |
| 1543488 | 10/1968 | France |
| 354762 | 7/1987 | Germany |
| 3602153 | 7/1987 | Germany |
| 3731766 | 3/1989 | Germany |
| 3828516 | 3/1989 | Germany |
| 3800723 | 7/1989 | Germany |
| 3801634 | 8/1989 | Germany |
| 3806131 | 8/1989 | Germany |
| 3910554 | 10/1989 | Germany |
| 3823205 | 1/1990 | Germany |
| 2193656 | 2/1988 | United Kingdom |
| WO94/14608 | 7/1994 | WIPO |
| WO94/20334 | 9/1994 | WIPO |
| WO94/21494 | 9/1994 | WIPO |
| WO94/27842 | 12/1994 | WIPO |

OTHER PUBLICATIONS

SAE Technical Paper Series, 870011, entitled "Urban Bus Application of a Ceramic Fiber Coil Particulate Trap," 1987. H. O. Hardenberg, pp. 17–25.

"Experiences in the Development of Ceramic Fiber Coil Particulate Traps," SAE Technical Paper Series 870015, 1987.

Brochure of TRW Vehicle Safety Systems Inc., entitled "Inflatable Restraint Systems," dated Nov. 1991.

AIRBAG FILTER ASSEMBLY AND METHOD OF ASSEMBLY THEREOF

This is a continuation of application Ser. No. 08/489,082, filed Jun. 9, 1995, now abandoned.

BACKGROUND OF THE INVENTION

This invention relates to inflatable airbag restraint systems used in vehicles for driver and passenger protection during a collision. More particularly, this invention relates to an airbag inflation filter for use in filtering the particles released during the instantaneous discharge required to inflate vehicle airbags.

Instantaneously inflatable airbags have become more and more common as a means of protecting automobile drivers and passengers in the event the vehicle encounters a sudden deceleration, such as in a collision. The airbag restrains movement of an occupant of the vehicle during the collision, and is inflated by gas generated by actuation of gas-generating material contained in an airbag inflator. The airbag inflates in a very short period of time (typically 20–80 milliseconds) by the rapid ignition and combustion of the gas generating material. The gas generated, which is initially at high temperature (e.g., 700° C.–1200° C.) and pressure (e.g., 2000 PSI), contains fine molten particles of metal and/or reactive oxides. In order to avoid damaging the bag or burning the skin or clothing of the vehicle's passengers, the gas must be filtered to remove the particles prior to entering the airbag.

An airbag filter thus functions to cool the hot gases before they reach the airbag, and serves to eliminate particulates and residues generated during ignition so that they do not enter the airbag and contaminate the vehicle.

Suitable filters for removing these particulates must be capable of withstanding relatively high temperatures and have been described in the prior art. The most common type of filter employs layers of woven or knitted metal mesh screen sheets, often times with additional layers of ceramic or metal sheet wool, or ceramic or glass paper, or ceramic or glass fabric. These materials are wrapped in layers about a perforated support tube, and that structure has been tightly wound with a single heavy-gauge wire welded to the outside of the finished part. The airbag inflator filter designs of the prior art are typically hand assembled and tend to be labor intensive and expensive. These filter materials are generally quite heavy and filter construction is complex. Usually, several material layers are spirally wound into a unitary structure. Because of this complexity, it is very difficult to maintain the exact same filtering characteristics from filter to filter, and to obtain consistent filter performance. This is due not only to inconsistency of the materials applied in the manufacturing procedure, but also because of the fact that spiral wrapping necessarily forms different depths of filtration material about the filter. Ceramic papers are often used, which do not have both low porosity and high strength. They therefore must be sandwiched between layers of wire screen, thereby significantly increasing the weight of the filter. Ceramic paper also is inherently nonuniform. Examples of these types of filters are shown in the following patents: U.S. Pat. No. 4,012,211, U.S. Pat. No. 5,230,726, U.S. Pat. No. 5,268,013, U.S. Pat. No. 5,308,370, U.S. Pat. No. 5,346,252, U.S. Pat. No. 5,087,070, and U.S. Pat. No. 5,215,721.

Other filter materials include porous metal or ceramic foams usually coated with a thermal and structurally stable material. Examples of these filter materials are found in U.S. Pat. No. 5,372,380 and European Patent Application No. 0640515. The preferred coating technique in these instances is chemical vapor deposition, which is extremely expensive. It has also been proposed to filter airbag inflation gases with the airbag material itself. References which disclose this concept are U.S. Pat. No. 5,071,161, U.S. Pat. No. 4,536,439, U.S. Pat. No. 5,104,727, PCT Publication No. WO 94 26,334, and PCT Publication No. WO 94 21,494.

It is thus desired to develop a cleaner, lighter, more efficient airbag inflation filter. Efficiency in this regard means not only less expensive and easier to handle and manufacture, but also more efficient in filtering ability (i.e., allowing less particulate through the filter and into the airbag. While an airbag inflation filter is designed for only a single use as a filter, it must perform effectively when needed.

SUMMARY OF THE INVENTION

The present invention is an airbag inflation filter which includes a gas permeable, substantially rigid support tube having perforations therethrough, and a filter element formed from a continuous inorganic strand that is helically wound around the support tube to form one or more layers covering the perforations through the support tube. The present invention is thus a simple, lightweight, reproducible airbag inflation filter useful for removing particulates from the gas used to inflate an airbag.

In use, particulate-laden gas flows through the filter radially from the inside out, and substantially clean gas flows out of the filter. In a preferred embodiment, the airbag inflation filter includes a gas-permeable diffusion layer. The diffusion layer has perforations therethrough smaller than the perforations through the support tube.

Preferably, the strand is cross-wound around the support tube. In preferred embodiments, the strand has a core from which filaments or fiber segments project outwardly, and cores in successive convolutions are oppositely wound in each layer to provide interwoven cores. In one such embodiment, the cores of convolutions of each layer are spaced to afford substantially uniform four-sided openings within which at least one of the projecting filaments or fiber segments intermesh to form particulate traps. Further, the cores of convolutions of at least one layer are laterally offset from the cores of convolutions of an adjacent layer to deflect generally radial gas flow through the filtering element into tortuous paths therethrough. In another such embodiment, the successive convolutions of each successive layer are radially aligned to provide walls that are spaced to define four-sided openings within which at least one of the projecting filaments or fiber segments intermesh to form particulate traps. Preferably, the continuous strand is formed from a heat-resistant, texturized yarn.

An airbag filter inflator assembly is formed from a housing having walls defining a chamber for reception of an airbag inflation filter wherein the filter has a gas permeable, substantially rigid support tube having perforations therethrough, and a filtering element formed from a continuous inorganic strand that is helically wound around the support tube to form one or more layers covering the perforations through the support tube. The inflator assembly also has solid gas generating material disposed within the support tube of the airbag inflation filter, and means for activating the solid gas generating material to generate airbag inflation gas therefrom. The walls of the inflator housing have defined openings therethrough for directing the flow of the airbag inflation gas out of the housing.

Figure 1:
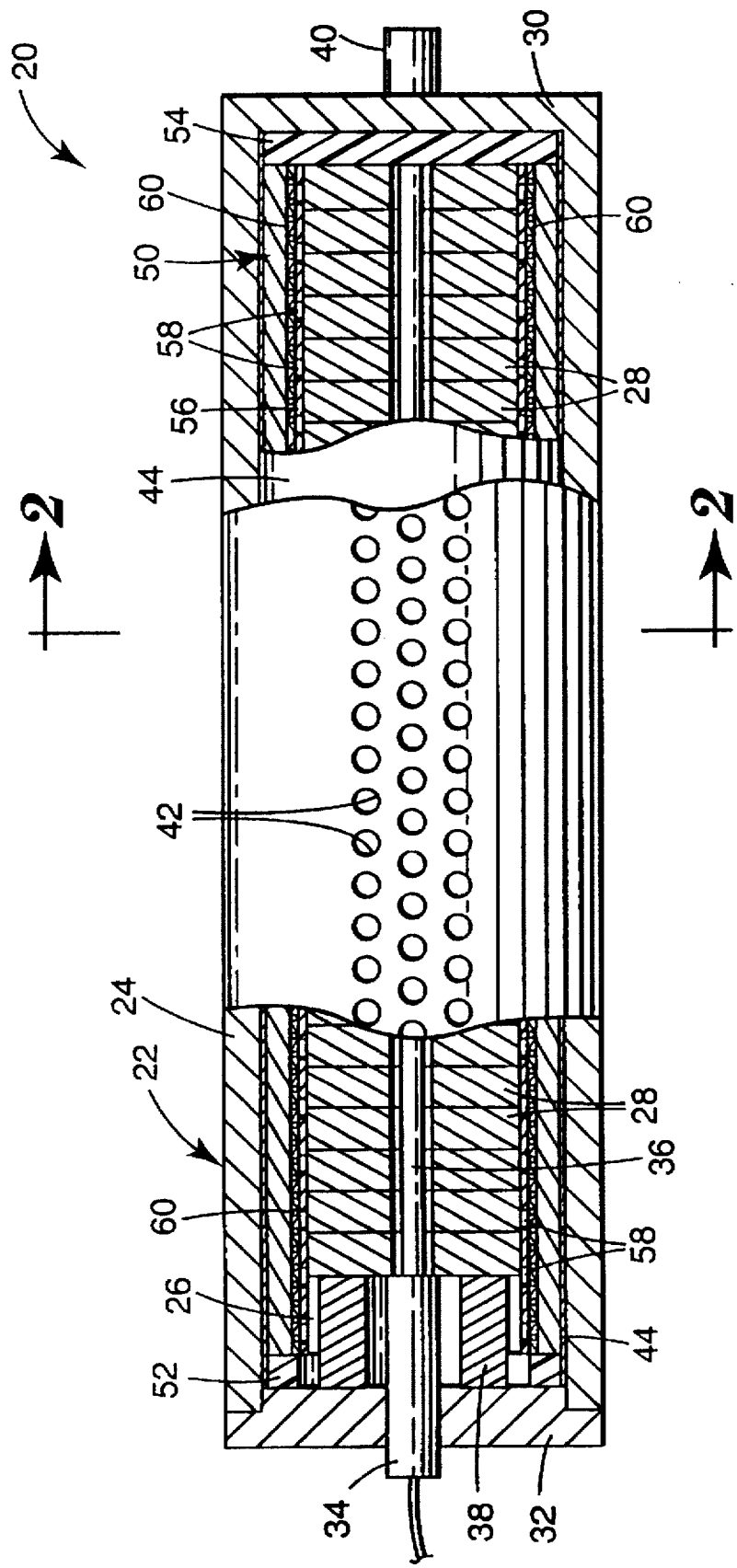
FIG. 1 is a schematic, partial sectional view through a passenger's side airbag inflator assembly which includes the airbag inflation filter of the present invention.

While the above-identified drawing features set forth preferred embodiments, other embodiments of the present invention are also contemplated, as noted in the discussion. The disclosure presents illustrative embodiments of the present invention by way of representation and not limitation. Numerous other modifications and embodiments can be devised by those skilled in the art, which fall within the scope and spirit of the principles of this invention. The drawing figures have not been drawn to scale as it has been necessary to enlarge certain portions for clarity.

DETAILED DESCRIPTION OF THE PREFERRED EMBODIMENTS

The present invention relates to an airbag inflation filter used to filter inflation gases for airbags to protect the occupants of a vehicle. The filter is designed to withstand the high temperature and gas pressures encountered from contact with gas generated in a pyrotechnic airbag inflator assembly from gas-generating material such as sodium azide wafers. The filter functions to cool the hot gases before they reach the airbag and serves to capture particulates and residues generated during ignition so that they do not enter the airbag and contaminate the vehicle.

In the description of the present invention and in the claims, the following terms are intended to have the meanings defined below:

"inorganic filament or fiber" refers to any inorganic-based filament or fiber which is resistant to high temperature (e.g., temperatures above approximately 400° C.), and has textile qualities (i.e., is suitable for making into a yarn which can be wound about a support tube, as defined);

"fiber segment" refers to the portion of a broken fiber protruding from the core of a strand;

"roving" means a plurality or bundle of generally parallel filaments or fibers;

"yarn" means a plurality or bundle of individual rovings which have been combined by means such as twisting or bundling;

"strand" means either a yarn or a roving;

"circuit" means one winding pass down and back of strand application onto a support tube; and "layer" means one complete covering of the support tube by strand windings in a predefined pattern, with each covering defined by a plurality of circuits.

Figure 2:
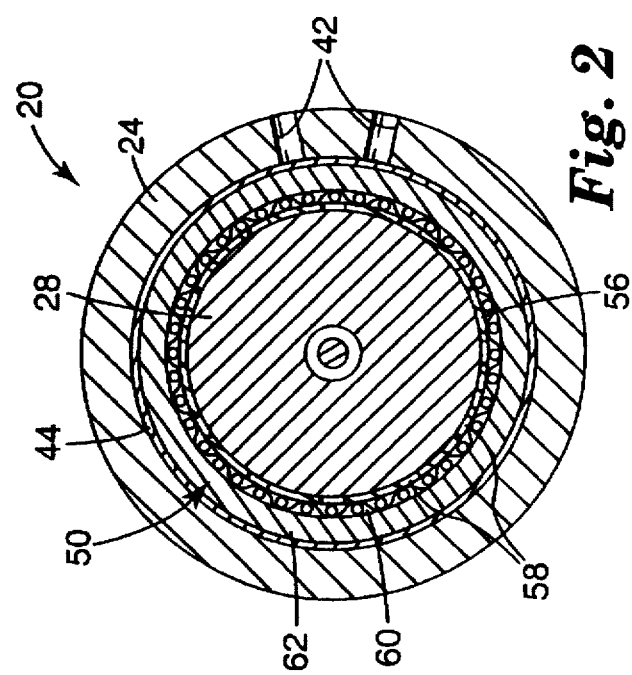
FIG. 2 is a sectional view as taken along lines 2—2 in FIG. 1.

FIG. 1 schematically illustrates an airbag inflator assembly for use on a passenger side airbag restraint system. The airbag inflator assembly 20 includes an inflator housing, indicated generally at 22, which has a cylindrical container 24 defining a cavity 26 therein. The container 24 holds solid gas-generating material 28 which is, in the embodiment shown, in disc form (see FIG. 2). As is well known, it may also be provided in other forms, such as pellets.

One end of the cylindrical container 24 is closed by an integral circular end wall 30. A separate end cap 32 is provided at the opposite end and is sealably secured in place by a suitable means (e.g., threaded, welded, or crimped on) after all of the internal components of the airbag inflator assembly 20 are in place within the housing 22. The end cap 32 has an initiator 34 extending coaxially and sealably therethrough, to ensure a gas-tight seal for the cavity 26. An inner end of the igniter 34 is coupled to igniter material 36 within the cavity 26 for activation thereof. One or more spacers 38 (either inert or formed of gas-generating material) may be disposed at either end of the cavity 26, as desired, for positioning of the gas-generating material 28. One or more alignment pins 40, support plates (not shown) or the like are provided on the housing 22 to facilitate mounting in place on a vehicle.

The cylindrical container 24 has a plurality of perforations 42 extending through its wall in order to permit gases generated by the airbag inflator assembly 20 to escape outwardly to fill and rapidly inflate an airbag into deployment. A layer of gas or moisture impermeable foil 44 is mounted on the inside surface of the cylindrical container 24. The foil 44 thus covers and seals the perforations 42 prior to use of the airbag inflator assembly 22 to inflate an airbag. The foil 44 bursts under the increased pressure developed upon formation of the inflation gases by activation of the gas-generating material 28.

A tubular airbag inflation filter 50 is disposed within the cavity 26 of the cylindrical container 24, between the inner surface of the container 24 and the gas-generating material 28. One or more annular spacers 52 or spacer discs 54 may be provided adjacent the ends of the inflation filter 50 for alignment and support thereof within the housing 22. The inflation filter 50 is positioned to be disposed between the gas-generating material 28 and the perforations 42 in the wall of the container 24, so that any gases generated must pass through the inflation filter 50 before being released into an airbag.

Figure 3:
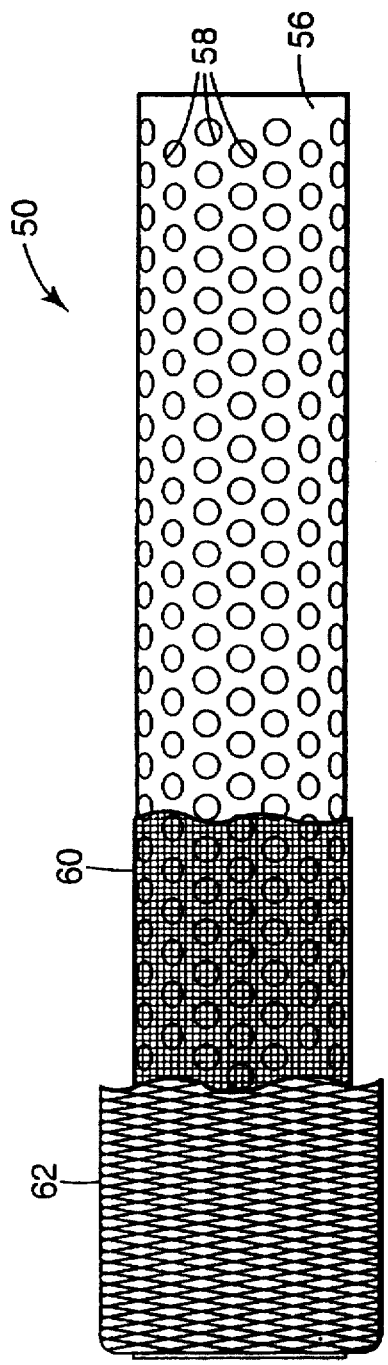
FIG. 3 is a side elevational view of an airbag inflation filter of the present invention, with layers broken away for illustrative purposes.
Figure 4:
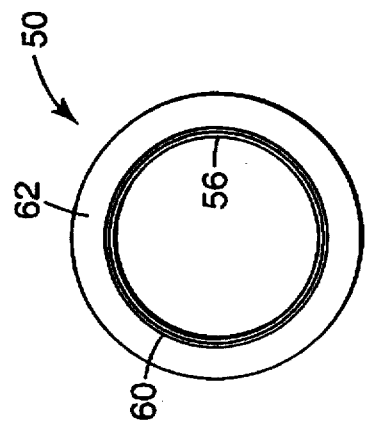
FIG. 4 is an end elevational view of the airbag inflation filter of FIG. 3.

A preferred embodiment of the airbag inflation filter 50 of the present invention is illustrated in FIGS. 3 and 4. The inflation filter 50 has a gas-permeable, substantially rigid support tube 56, having a plurality of perforations 58 extending therethrough. The support tube 56 comprises any material capable of maintaining its strength at high temperature (e.g., above 500° C.) such as, metals and ceramics. Metals such as steel and stainless steel are preferred. A wire mesh 60 is aligned over the support tube 56 to cover at least all of the perforations 58 therethrough. A filtering element 62 is formed from a continuous inorganic strand that is helically cross-wound over the wire mesh 60 and support tube 56 to form one or more layers covering the support tube 56, and particularly covering the perforations 58. Preferably, the perforations 58 are generally uniform in size and placement on the support tube 56. The openings in the wire mesh 60, also preferably generally uniform, are smaller in size than the perforations 58 through the support tube 56. The wire mesh 60 thus serves to diffuse inflation gases which are rapidly passed radially outwardly to the inflation filter 50 through the perforations 58.

Figure 5:
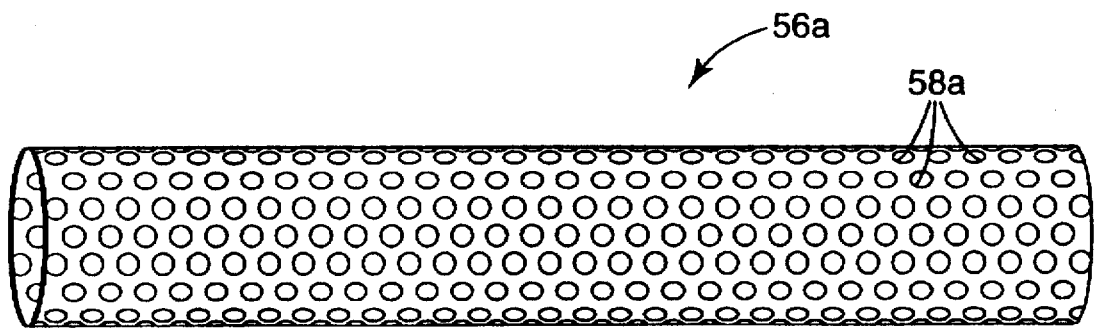
FIGS. 5, 6 and 7 are perspective views of alternative support tubes for the airbag inflation filter of the present invention.
Figure 6:
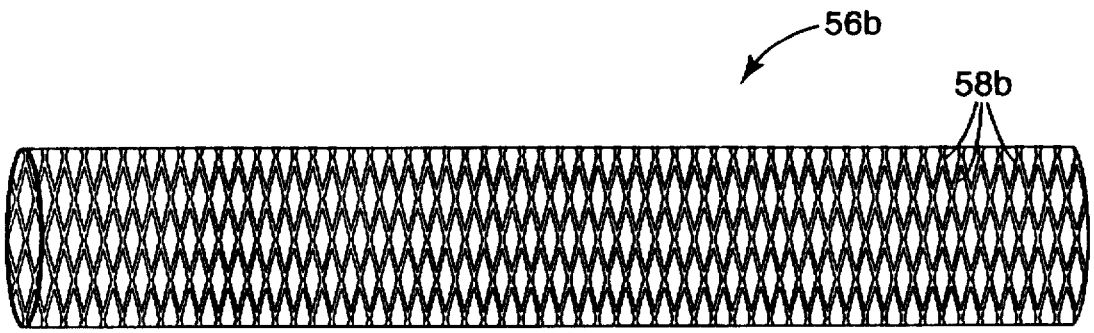
Figure 7:
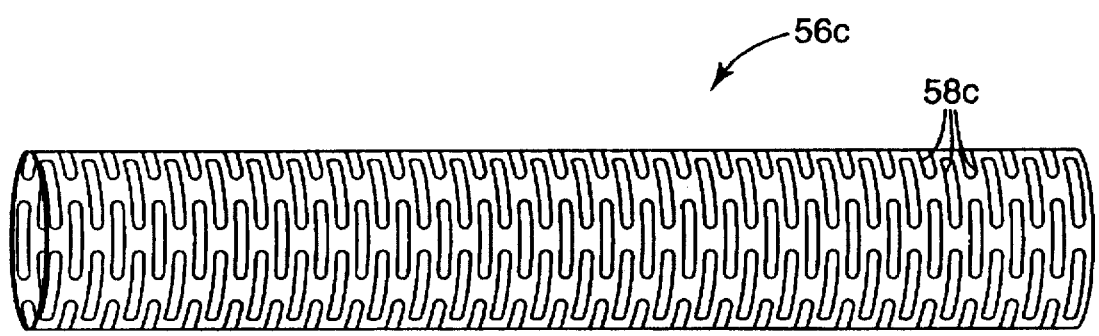

Alternative support tube configurations are shown in FIGS. 5, 6 and 7. FIG. 5 illustrates a perforated metal or ceramic support tube 56a wherein the perforations 58a extend completely from end to end of the support tube 56a, thus defining the entire support tube 56a as the perforation area. FIG. 6 illustrates an expanded metal support tube 56b wherein expansion of the metal segments defines the size of the perforations 58b. In an expanded metal tube 56b, the perforations 58b can thus extend from end to end of the tube 56. FIG. 7 illustrates a punched or slotted metallic or ceramic tube 56c having predefined perforations 58c. Again, the perforations extend from end to end on the tube 56c.

Regardless of the configuration of the support tube, the perforations in the support tube preferably occupy in the range from about 20 to 70 percent of the total lateral area of the tube, and are generally uniformly distributed over the length of the tube and that perforation area. The perforations can be of any desired geometrical shape. Although not shown, it is contemplated that other support tube configurations would be suitable for use in the present invention, such as, for example, a welded or woven screen.

In a preferred embodiment of the present invention, the filtering element 62 is formed by an inorganic strand substantially helically cross-wound around the support tube 56 (see FIG. 3). Examples of winding techniques of such inorganic strands around the support tube are found in U.S. Pat. No. 5,248,481 to Bloom, et al, describing a laterally offset winding procedure, and U.S. Pat. No. 5,248,482 to Bloom, et al, describing a radially aligned winding procedure. U.S. Pat. No. 5,248,481 and U.S. Pat. No. 5,248,482 are incorporated herein by reference.

In a lateral offset winding procedure, a continuous strand (which preferably has a plurality of loops of continuous filaments or fiber segments projecting outwardly therefrom) is substantially helically cross-wound around the support tube to form a plurality of layers of strands. Successive convolutions of the strand are oppositely wound in layers to provide interwoven cores. The cores of successive convolutions of each successive layer are spaced to define four-sided openings, with the loops of filaments or fiber segments on the strand projecting into each of the four-sided openings to provide a trap for particulates in the airbag inflation gas. The cores of the strand in at least one layer are laterally offset from the cores of the strand in an adjacent layer to deflect the gas into a tortuous path through the filtering material.

Figure 8:
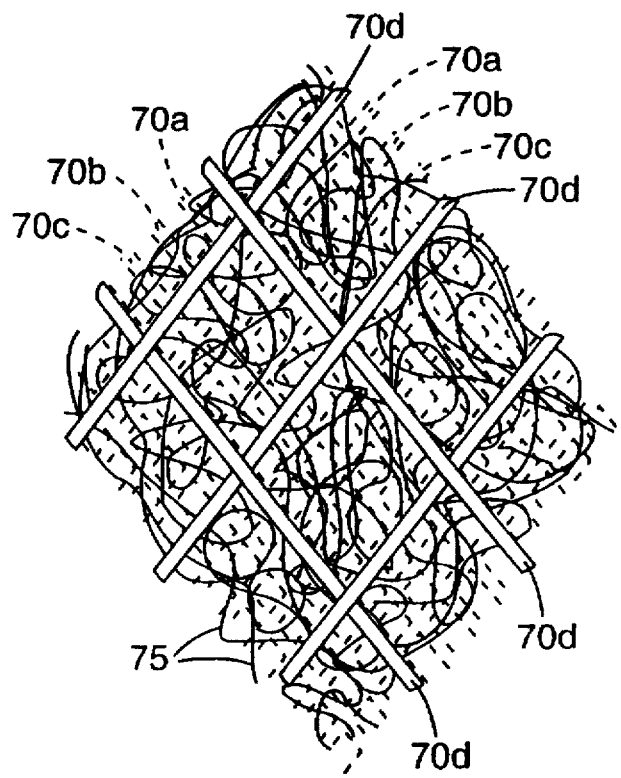
FIG. 8 shows a greatly enlarged portion of the surface of the airbag inflation filter of the present invention.
Figure 9:
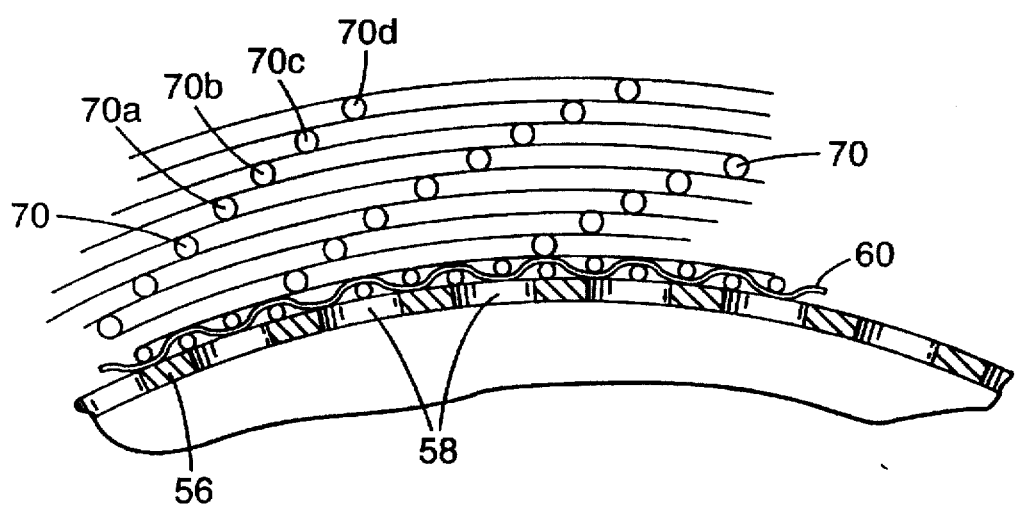
FIG. 9 is a greatly enlarged partial schematic sectional view, as taken laterally along the inflation filter of the present invention.

Referring to FIGS. 8 and 9, the laterally offset winding construction for a continuous strand is illustrated. FIG. 9 illustrates an eight-layer filtering element formed by helically winding a strand 70. As seen, the cores of the strand in one layer are laterally offset from the cores of strands in adjacent layers. The surface effect of this helical cross-winding is seen in FIG. 8, wherein the strands 70a, 70b, 70c and 70d are seen for the outermost four layers, along with intermeshed filament loops or fiber segments 75.

The radially aligned winding procedure also uses a strand which has filaments or fiber segments projecting outwardly therefrom, and which is helically cross-wound around the support tube. Successive convolutions of strand are oppositely wound in layers to provide interwoven cores, with the cores of the successive convolutions of each layer radially aligned to provide walls that are spaced to define four-sided openings. The loops of filaments or fiber segments of the strand project into each of the four-sided openings to provide a trap for particulate material.

Figure 10:
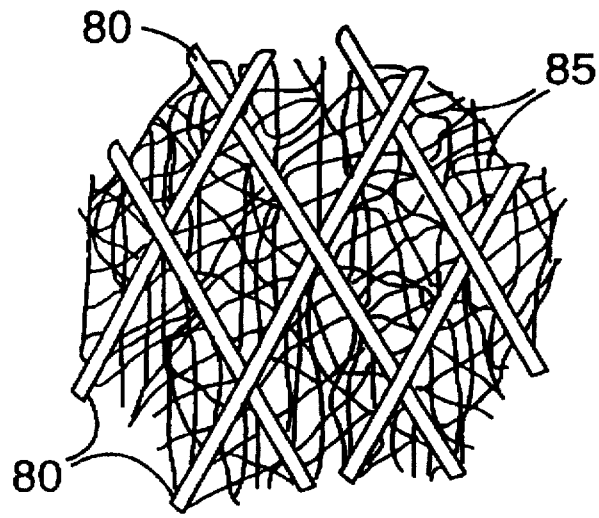
FIG. 10 is a greatly enlarged portion of the surface of an alternative embodiment of the airbag inflation filter of the present invention.
Figure 11:
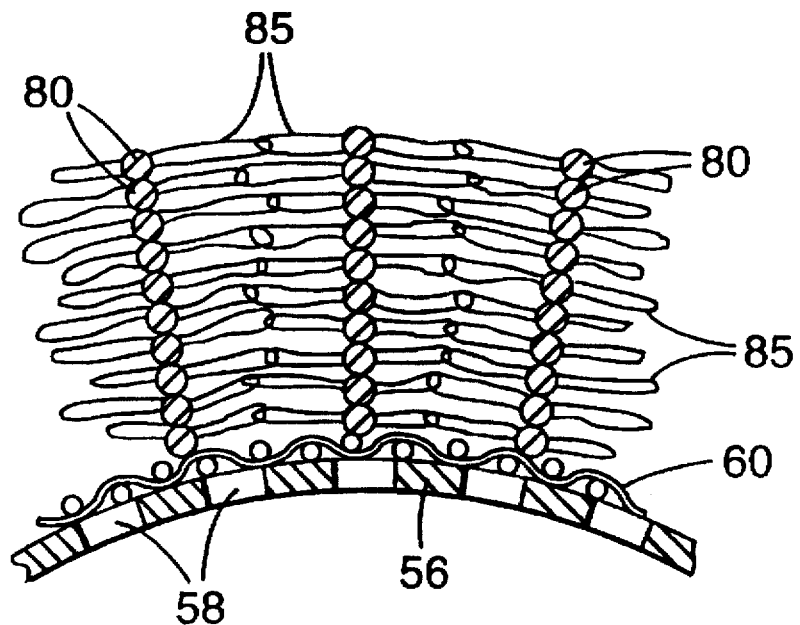
FIG. 11 is a greatly enlarged partial schematic sectional view, as taken laterally along an alternative embodiment of the inflation filter of the present invention.

The radially aligned winding configuration is illustrated in FIGS. 10 and 11. In this embodiment, an eight-layer filtering element is also illustrated, having been formed by helically winding a strand 80. Each strand 80 has its core radially aligned with the core of the strands in adjacent convolutions. Loops of continuous fibers or fiber segments 85 protrude outwardly from each strand 80 and intermesh to define particulate material traps.

In addition to the lateral offset and radially aligned winding techniques discussed above, it is also contemplated that one or more layers of the continuous strand be wound by a level winding technique. It is further contemplated that the lateral offset, radially aligned and level winding techniques can be combined to achieve alternative strand winding patterns for the filtering element of the present invention. Preferably, the thickness of the filtering element of the present invention is from about 1 to about 15 millimeters thick.

In a preferred embodiment, the strand is formed from heat-resistant inorganic yarn cross-wound over the support tube and having a diameter in the range of about 0.5 to about 5 millimeters. The inorganic yarn is made from individual inorganic fibers or filaments. Such yarns are typically comprised of in the range of about 700 to about 8000 or more individual inorganic filaments or fibers (preferably 1400 to 3500 individual fibers or filaments). Individual fibers or filaments typically have a diameter that ranges from about 2 microns to about 20 microns (preferably 6 microns to 12 microns). The inorganic yarn is ply-twisted because such construction can be texturized to provide a superior filtering material when compared to inorganic yarn which is not ply-twisted.

In this application, suitable inorganic fibers include ceramic fibers such as alumina-silica, zirconia-silica, graphite, alumina-chromia-metal oxide, and preferably alumina-boria-silica (such as NEXTEL™ 312, 440 or 550 ceramic fibers (commercially available from Minnesota Mining and Manufacturing Company of St. Paul, Minn.), high-temperature glass fibers such as S-2 glass or E glass (commercially available from Owens-Corning of Toledo, Ohio), continuous fused silica fibers, such as ASTROQUARTZ™ fibers (commercially available from J. P. Stevens Company of Slater, N.C.), QUARTZEL™ fused quartz yarn (commercially available from Quartz Products Corporation of Louisville, Ky.), leached glass fibers, such as REFRASIL™ fibers (commercially available from Hitco Materials of Gardena, Calif.), nonvitreous ceramic fibers, such as NICALON™ fibers (commercially available from Nippon Carbon of Tokyo, Japan), and continuous aluminasilica fibers, such as NITIVY™ fibers (commercially available from Nitivy Co., Ltd. of Japan), or combinations thereof.

Texturization of the inorganic yarn improves its filter or trapping efficiency. Preferably, the inorganic yarn is texturized such that it is lofty, e.g., by being texturized so that loops of continuous filaments, individual fiber segments, or a combination thereof extend outwardly from a dense core. The inorganic yarn can be texturized by techniques known in the art including, for example, air jet or mechanical texturization. Air jet texturization is preferred because it generally provides a texturized yarn having fewer fiber segments and more filament loops than does yarn texturized by the mechanical technique. A suitable air jet texturizing machine for this purpose is available under the trade designation MODEL 17 SIDEWINDER from Enterprise Machine & Development Corporation of New Castle, Del. Preferably, the texturized yarn has a diameter in the range of about 1 mm to about 10 mm.

Alternatively, the strand may be formed from a roving of inorganic material. An untwisted roving is formed from a plurality or bundle of filaments or fiber segments aligned longitudinally. Typically, a plurality of rovings are twisted together to form a single piece of yarn. However, a roving itself bears fiber elements and filaments and thus can serve as a strand in this instance. Furthermore, because the roving has not been twisted, lateral pressure (such as applied during winding under tension) to the roving causes the filaments and fiber segments to splay outwardly from the strand, thereby allowing them to become interwoven upon successive overlapping windings of the roving. In a further contemplated embodiment, an individual roving may be twisted and then wound as a strand to define the filtering element of the airbag inflation filter of the present invention.

The band width (spacing between adjacent strand cores on the same layer), strand diameter, wind angle, number of layers, winding tension and winding pattern can be varied to obtain the desired filtration efficiency and pressure drop in an airbag inflation filter of the present invention. Preferably, the strand is wound at an angle of at least 50 degrees and less than 90 degrees to the axis of the support tube. More preferably, the strand wind angle is between about 75 degrees and about 85 degrees. In one preferred embodiment, the strand wind angle is about 80 degrees. It is contemplated that the strand wind angles of successive layers may vary.

A further means of controlling the efficiency of the filtering element is to vary the texturization of the strand layers comprising the filtering element. For example, the innermost layers can be less texturized (i.e., less projecting filaments or fiber segments) than outer layers. This arrangement allows the particulate traps on the inner layers to catch gross particles, while the particular traps on the outer layers will capture finer particles. Such texturization varying can be performed on the same strand, or separate layers of different strands (each strand having different texturization) can be wound sequentially on the support tube. Thus, strands of varying texturization level or strands of varying composition can be used.

The employment of such a steep winding angle (preferably about 80 degrees) causes very narrow four-sided openings or diamond patterns in the filtering element. This higher angle provides more stability in this extremely high pressure environment of an airbag inflation filter. Such an inflation filter is only designed for a single use, and the explosion of the gas-generating material tends to increase the diameter of its containing members, and thereby decrease their length. The steep winding angle of the filtering element strand acts to counteract this tendency, at least for the filtering element, and provide additional stability to the filtering element.

The use of a helically cross-wound inorganic strand formed filtering element such as described above provides an extremely consistent filter, as compared to the spiral-wrapped, layered airbag filters of the prior art. While such a construction is preferred to attain such consistency, it may be undesirable from a cost standpoint. Inorganic strands, such as ceramic yarns, are relatively expensive compared to some alternative filtration materials. Thus, it may be desirable to provide the wound inorganic strand layers adjacent the support tube (where the gas temperatures will be higher) but to provide less expensive and lower temperature resistant filtration materials as one or more outer layers.

As described above (and illustrated in FIGS. 3 and 4), in one preferred embodiment the filtering element includes a layer defined by a metal mesh or screen. It is also contemplated that this metal mesh be eliminated from the filtering element, thus leaving only the support tube and helically cross-wound inorganic strand layers as the inflation filter structure.

In addition to one or more metal mesh or screen diffusion layers, it is also contemplated that one or more layers of other materials may be provided in forming the filtering element of the present invention. Such materials include metal wool (i.e., a nonwoven mesh), ceramic or glass fabric (which could be woven, knitted or braided, or a combination of glass or ceramic fabric), glass or ceramic nonwoven material, or glass or ceramic paper. For additional strength, metal wire or high-strength organic fiber (e.g., KEVLAR™ fibers (commercially available from E. I. du Pont de Nemours and Company, Inc., of Wilmington, Del.) can be wound with the inorganic strand layers or over the top of the inorganic strand on the support tube (or twisted with the inorganic strand prior to winding).

Figure 12:
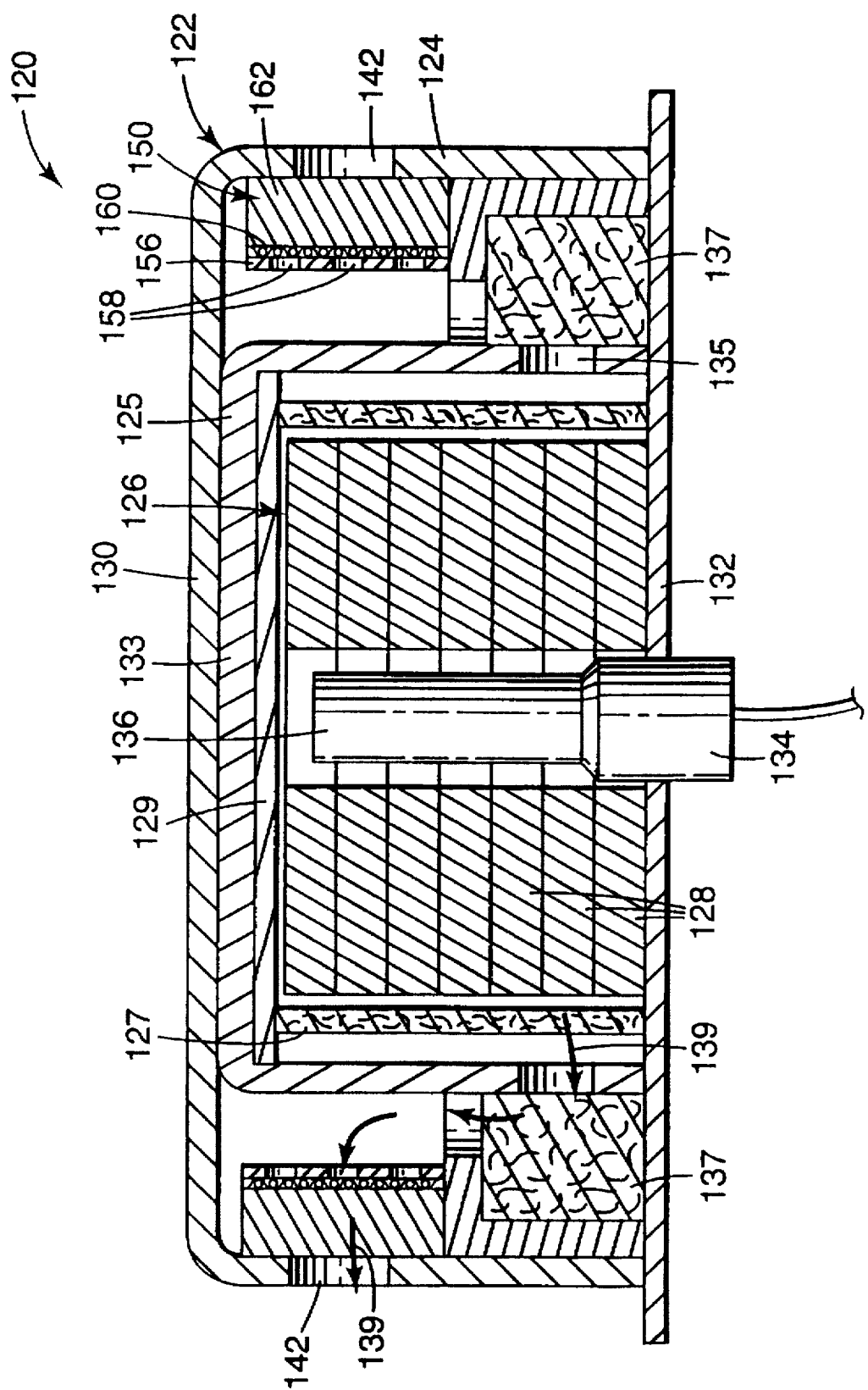
FIG. 12 is a schematic sectional view of a driver's side airbag inflator assembly which includes an airbag inflation filter of the present invention..

The airbag inflation filter of the present invention is applicable to various inflater constructions. As illustrated in FIGS. 1–7, the inflation filter is adapted for use in a passenger side airbag filter assembly. FIG. 12 illustrates schematically a driver's side airbag filter assembly construction, which is typically mounted in the steering wheel of the vehicle. Since the steering wheel is closer to the driver than the dashboard to the passenger, the driver's side airbag is smaller, thus requiring a smaller amount of gas generating material and a smaller filter.

In FIG. 12, airbag inflator assembly 120 includes an inflater housing 122 which is defined by a generally cylindrical canister 124. The canister 124 has a coaxially aligned internal cylindrical container 125 defining a cavity 126 therein. Gas generating material 128 is coaxially aligned within the cavity 126, in disc form, as illustrated, or in other suitable form. Typically, a pre-filter 127 is disposed between the gas generating material 128 and the inner container 125. One or more spacers 129 may be disposed within the cavity 126, relative to the pre-filter 127 and the gas generating material 128.

The cylindrical canister 124 has an integral circular end wall 130 at one end, and is fixedly mounted to a circular end cap 132 at its other end. The end cap 132 is also sealably connected to close one end of the inner cylindrical container 125 and its cavity 126. A circular integral end wall 133 closes its other end, adjacent end wall 130 of the cylindrical canister 124. An igniter 134 is coaxially disposed through the end cap 132, and operably coupled to igniter material 136 positioned within the cavity 126.

The inner cylindrical container 125 has a plurality of radially disposed openings 135. These openings 135 lead to an annular slag screen 137. Gas created by the gas-generating material must pass through the pre-filter 127, openings 135 and slag screen 137 before encountering the tubular airbag inflation filter 150 of the present invention. This defined flow pattern is illustrated generally by arrows 139 in FIG. 12. The cylindrical canister 124 has a plurality of radially disposed perforations or opening 142 therein. Again, a foil (not shown) may be provided to seal the perforations 142 prior to activation of the gas-generating material 128.

The tubular airbag inflation filter 150 of the present invention is disposed in the inflater assembly 120 adjacent the perforations 142. The overall structure of the inflation filter 150 is the same as previously described although the relative dimensions are different. A support tube 156 is provided having perforations 158 therethrough. A wire mesh 160 may be positioned about the support tube 156 to cover at least the perforations 158. An inorganic material filtering element 162, formed in the same inventive manner as described above, is then provided on the wire mesh 160 and support tube 156 assembly. Although differing in configuration, the operation of the tubular airbag inflation filter 150 in the inflater assembly 120 is functionally the same as the inflation filter 50 in inflater assembly 20.

An airbag inflation filter of the present invention presents a number of advantages over the airbag inflation filters of the prior art. The inflation filter of the present invention has a lower heat capacity than the prior art inflation filters. It absorbs less heat from the expanding inflation gases and, therefore, can allow the devotion of more charge energy to the desired inflation blast. Thus, a smaller inflation charge is possible, since the filter does not absorb as much inflation energy. The formation of the filtering element of the present invention is done on a computer-controlled winding machine with the inorganic strand being laid down very precisely. This highly-controlled process results in a more consistent filter structure and filtration performance than possible with the prior art. The use of a continuous inorganic yarn as the strand results in the material having high tensile strength and one which can be wound to the desired porosity. Thus, it overcomes problems associated with the low-tensile strength ceramic papers contained in airbag filters of the prior art. The airbag inflation filter of the present invention requires less manual assembly, fewer components, is easier to manufacture and is lighter in weight than prior art inflation filters.

Other advantages from the inventive structure are illustrated in the following examples, which illustrate presently contemplated preferred embodiments and the best mode for practicing the invention, but are not intended to be limiting thereof.

EXAMPLES

Six airbag inflation filters of the present invention were constructed, and are referenced herein as sample filters A, B, C, D, E and F. For each sample filter, the support tube constituted a 28 gauge (0.4 mm) stainless steel support tube 1.56 inches (39.8 mm) in outer diameter and 9.33 inches (237 mm) in length. A central perforated portion was 63 percent open via round perforations of the same size (each perforation was a 0.1875 inch (4.76 mm) diameter hole, and there were non-perforated margins (approximately 0.785 inches (19.94 mm) in length) on each end of the support tube. A support tube of this type is illustrated in FIG. 3.

Each of the perforated support tubes was mounted on a computer controlled filament winder. A suitable winder for this purpose is a Model W35, three axis filament winding machine, available from McClean Anderson, of Schofield, Wis. As mentioned, six airbag inflation filters were formed by helically cross-wound strand winding. Three different strand winding protocols were used, with each protocol used to wind a pair of sample airbag inflation filters. In each pair, one sample filter had only the perforated support tube, and the other had a stainless steel wire mesh (46% open area-40/40 mesh 0.008 inches (0.203 mm) wire diameter) wrapped (one layer) about the perforated support tube. The first winding protocol used the radially aligned winding procedure (sample filters A and B), the second winding procedure used the lateral offset winding procedure (sample filters C and D), and the third winding procedure used a multi-angle lateral offset winding procedure (sample filters E and F).

All of the sample filters were wound with NEXTEL™ 312 yarn. This material is an inorganic fiber, NEXTEL™ 312, 1800 Denier, 170 sized, ply-twisted into a 2/2 1.5 z construction, which was subsequently air jet texturized. The MODEL 17 SIDEWINDER air jet texturizing machine of Enterprise Machine & Development Corporation, New Castle, Del., was used for this purpose. A 52D air jet set was used, with a machine speed set at 26.5 m/min, the jet set at a three-quarter turn from its most closed position and operating under an air pressure of 585 kPa. Winding for all sample filters was done with 1000 grams tension on the yarn. Table 1 outlines the parameter and winding data from the six sample airbag inflation filters.

TABLE 1

|  | A | B | C | D | E | F |
| --- | --- | --- | --- | --- | --- | --- |
| Layers | 4 | 4 | 8 | 8 | 4 | 4 |
| Band Width (mm) | 1.52 | 1.52 | 3.04 | 3.04 | 1.52 | 1.52 |
| Wind Angle (degrees) | 80 | 80 | 80 | 80 | 80/80/50/80 | 80/80/50/80 |
| Circuits/Layer | 14 | 14 | 7 | 7 | 14/14/53/14 | 14/14/53/14 |
| Outer Diameter (mm) | 51.2 | 51.9 | 51.7 | 53.5 | 51.5 | 52.5 |
| Total Weight (grams) | 217.1 | 247.2 | 217.9 | 248.4 | 219.2 | 248.9 |
| Fiber Weight (grams) | 143.6 | 145.1 | 144.4 | 146.3 | 145.7 | 146.8 |
| Wire Mesh | No | Yes | No | Yes | No | Yes |

The length of the filtering element formed on the support tube, for each sample filter was approximately 9.27 inches (235.5 mm). After being wound, each sample inflation filter was placed in a controlled heating environment to remove inorganic material (the 170 sizing) from the yarn. This heat cleaning process was controlled by ramping up the temperature from room temperature at 10° C. per minute to 550° C., and maintaining that temperature for 30 minutes before cooling to room temperature.

The six sample airbag inflation filters were tested, as reported below, and compared to two prior art style airbag inflation filters, which are referenced herein as filter PA-1 and PA-2. These prior art filters were a composite of screen, wool and ceramic paper wound on a perforated steel tube. Each had a perforated 28 gauge (0.4 mm) stainless steel tube that had an outer diameter of 1.56 inches (39.8 mm). The tube length for prior art filter PA-1 was 9.33 inches (237 mm), and the tube length for the prior art filter PA-2 was 9.95 inches (252.9 mm). A 29.52 inches (750 mm) long piece of stainless steel woven screen, 24×24 mesh with 0.011 inch (0.279 mm) wire diameter, having a width the same as the length of the tube was tightly wrapped around the perforated tube. Wrapped within the screen was a thin layer of steel wool having wires of approximately 0.001 inch (0.279 mm). The steel wool had a width extending approximately the same as the tube length, and had a wrapped length of approximately 18.11 inches (460 mm). Also wrapped within the screen was a thin layer of ceramic paper, which likewise had a width approximately the same as the length of the tube, and had a wrapped length of approximately 5.98 inches (152 mm). The wound screen was spot welded together to secure the layered components in place about the perforated tube, and a 0.035 inch (0.889 millimeter) stainless steel wire was spiral wrapped around the outside of the screen and spot welded in place. The outer diameter of both the finished prior art airbag inflation filters was 2.00 inches (51 mm). Other than the length of prior art filter PA-2, the support tubes for these two prior art inflation filters were believed to be identical to those used to construct the six sample inflation filters. Prior art filter PA-1 had a total weight of 483.3 grams, while prior art inflation filter PA-2 had a total weight of 511 grams.

The six sample airbag inflation filters and the prior art airbag inflation filter PA-1 described above were flow tested at ambient conditions. The pressure drop across each filter was recorded, with the flow direction being from inside the filter to outside the filter. The pressure drops measured at various flow rates for the six sample inflation filters and prior art filter PA-1 are listed in Table 2 below.

TABLE 2

| Flow (m³/min) | PRESSURE DROP (INCHES OF WATER)/kPa | | | | | | |
|---|---|---|---|---|---|---|---|
| | A | B | C | D | E | F | PA-1 |
| 1.02 | 4.75 | 4.75 | 4.00 | 4.12 | 5.00 | 3.75 | 27.02 |
| 1.47 | 8.12 | 8.75 | 7.50 | 7.00 | 8.75 | 7.00 | 38.12 |
| 1.78 | 11.00 | 11.37 | 9.75 | 9.25 | 11.12 | 9.75 | 47.14 |
| 2.06 | 13.50 | 13.75 | 12.00 | 11.62 | 13.75 | 12.25 | 54.77 |
| 2.32 | 15.50 | 16.00 | 14.50 | 13.50 | 16.12 | 14.00 | 59.62 |
| 2.54 | 17.50 | 18.00 | 16.37 | 15.25 | 17.75 | 16.12 | 65.15 |
| 2.71 | 19.75 | 20.00 | 18.12 | 17.25 | 20.12 | 18.00 | 71.43 |
| 2.91 | 21.75 | 22.00 | 20.00 | 19.00 | 21.75 | 19.62 | 76.25 |
| 3.11 | 23.75 | 24.00 | 21.87 | 20.87 | 23.75 | 21.62 | |
| 3.25 | 25.75 | 26.12 | 23.75 | 22.25 | 25.75 | 23.62 | |
| 3.39 | 27.50 | 27.72 | 25.25 | 24.00 | 27.37 | 25.22 | |
| 3.56 | 29.25 | 29.25 | 27.00 | 25.62 | 29.50 | 26.87 | |
| 3.71 | 31.25 | 31.00 | 28.87 | 27.00 | 31.25 | 28.87 | |
| 3.85 | 33.25 | 32.75 | 32.62 | 28.75 | 32.75 | 30.25 | |
| 3.99 | 34.75 | 34.50 | 32.00 | 30.50 | 34.39 | 31.75 | |

Figure 13:
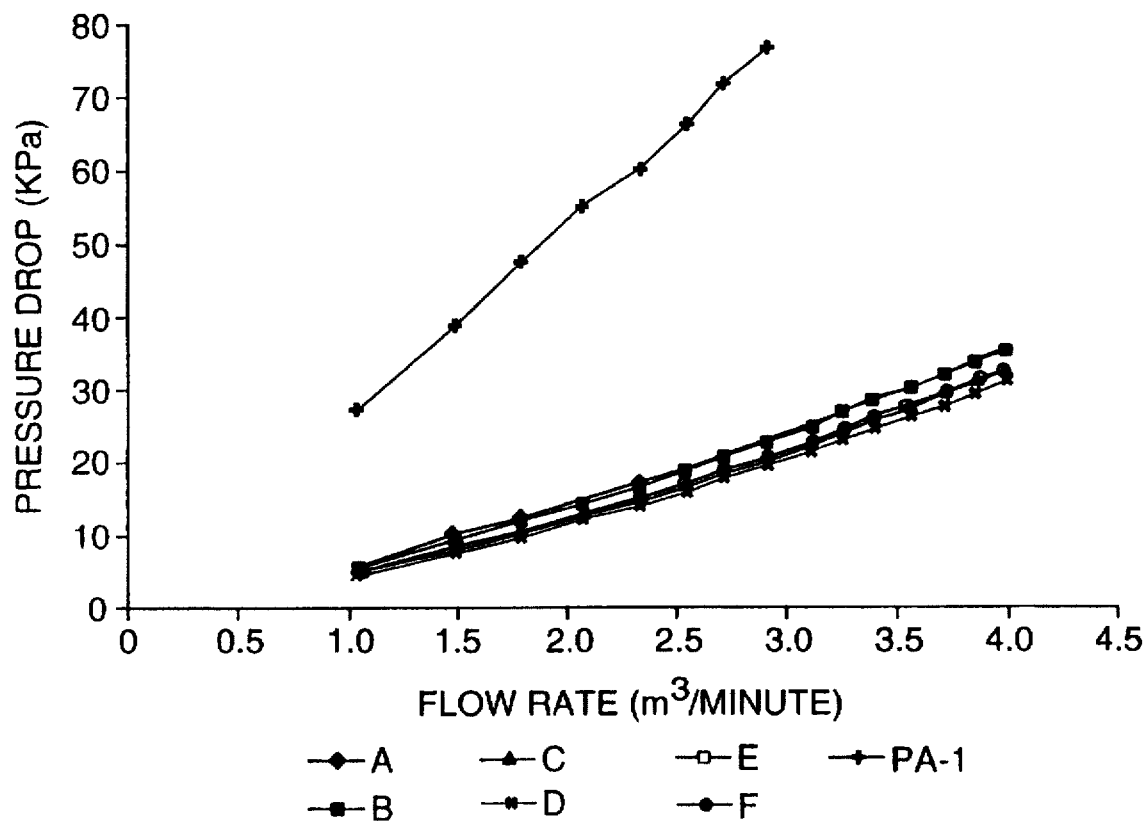
FIG. 13 is a graphic representation of flow rate vs. pressure drop for sample and prior art inflation filters.

The information set forth in Table 2 is illustrated graphically in the graph of FIG. 13. As seen, all of the sample airbag inflation filters of the present invention show lower pressure curves than the prior art airbag inflation filter PA-1.

Filtration efficiencies of the airbag inflation filters were measured by challenging the filters with 0.75 micron sized air-borne particles at a flow rate of nominally 40 CFM (1.13 m³/min). The particles were monodisperse dioctyl sebacate (DOS). An aerosol generator provided the particles, which were then diluted with filtered compressed air. The number of particles in the flow stream were measured by condensation nucleus counters (CNC), both upstream and down stream from the filter.

An efficiency percentage was then determined from concentration measurements taken from the upstream and downstream sides of each filter. The percent efficiency is calculated using the following formula: Percent Efficiency= (1−downstream concentration/upstream concentration)× 100. The comparative data collected is presented below in Table 3.

TABLE 3

| | A | B | C | D | E | F | PA-1 | PA-2 |
|---|---|---|---|---|---|---|---|---|
| Flow (m³/min) | 1.14 | 1.14 | 1.14 | 1.14 | 1.13 | 1.14 | .98 | .98 |
| Δ P (kPa) | 7.8 | 7.55 | 6.22 | 6.03 | 6.98 | 5.63 | 12.50 | 12.50 |
| Percent Efficiency | 99.93 | 99.94 | 99.92 | 99.91 | 99.93 | 99.90 | 98.36 | 97.79 |

Figure 14:
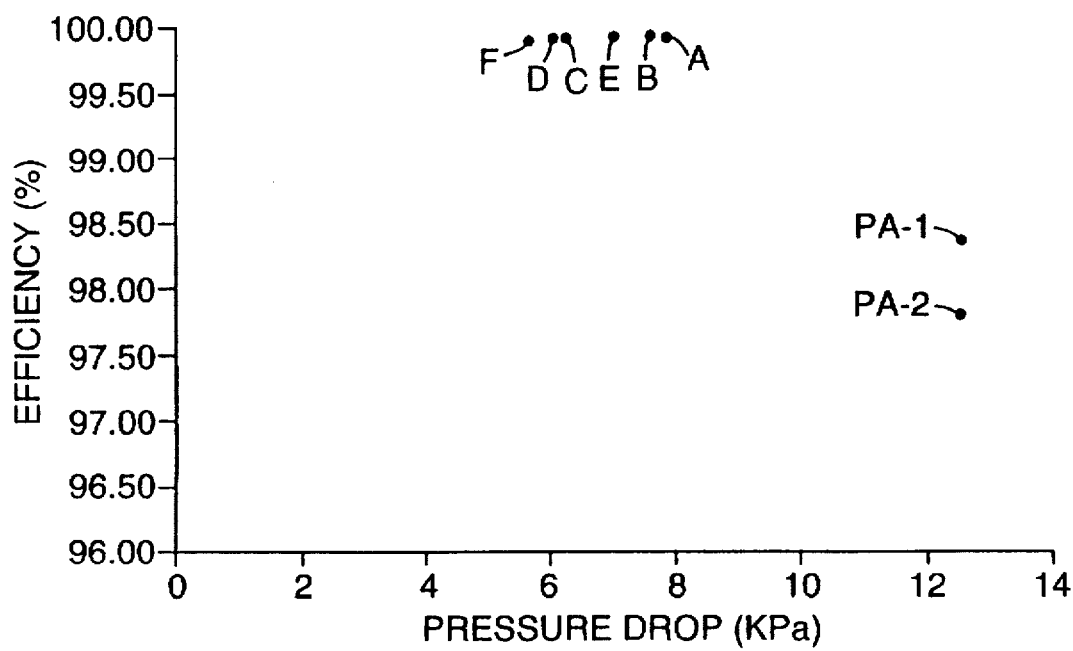
FIG. 14 is a graphic representation of pressure drop vs. percent efficiency for sample and prior art inflation filters.

FIG. 14 shows that the efficiency results of the six sample airbag inflation filters of the present invention at 22 inches of water (5.5 kPa) to 32 inches of water (8.0 kPa) pressure drop are higher than the efficiency results from the prior art airbag inflation filters PA-1 and PA-2. The prior art airbag inflation filter efficiency results are lower with a higher pressure drop of 50+ inches of water (12.5+ kPa). The test equipment in this case was only capable of producing data up to 50 inches of water.

Another means for correlating physical differences in airbag filters is light measurement testing. This measures the amount of light transmitted through the filter media of the airbag inflation filter. A TES-36 Spere Transmission Evaluation System, manufactured by Hoffman Engineering of Stamford Conn., was used to determine percent light transmission. The results of these comparative tests are listed in Table 4 below. The sample airbag inflation filters allow a measurable amount of light to pass therethrough while the prior art airbag inflation filters fail to transmit any measurable light.

TABLE 4

| | A | B | C | D | E | F | PA-1 | PA-2 |
|---|---|---|---|---|---|---|---|---|
| Percent Light Transmitted | 0.49 | 0.16 | 0.48 | 0.18 | 0.57 | 0.18 | 0 | 0 |

Although the present invention has been described with reference to preferred embodiments, workers skilled in the art will recognize that changes may be made in form and detail without departing from the spirit and scope of the invention. For example, the perforations in the support tube may be nonuniform, either varying by perforation size or pattern in a selected manner to define a desired inflation gas flow through the filtering element and into an airbag.

What is claimed is:

1. An airbag inflation filter comprising:
   a substantially rigid support tube having gas permeable perforations therethrough;
   a filtering element formed from a continuous inorganic strand that is helically wound around the support tube to form one or more layers covering the perforations through the support tube, each convolution of said strand extends at an angle in at least one layer of from about 75 degrees to about 85 degrees to the axis of the support tube; and
   a diffusion layer adjacent the perforations through the support tube, the diffusion layer being formed of a metal mesh having gas permeable perforations therethrough smaller than the perforations through the support tube.

2. The airbag inflation filter of claim 1 wherein each convolution of strand in at least one layer extends at an angle of about 80 degrees to the axis of the support tube.

3. The airbag inflation filter of claim 1 wherein the diffusion layer is disposed between the support tube and the filtering element.

4. The airbag inflation filter of claim 1 wherein the continuous strand is selected from the group consisting of a heat-resistant ceramic yarn, a heat-resistant glass yarn, a heat-resistant ceramic roving, a heat-resistant glass roving, a combined ceramic and glass heat-resistant yarn, and a combined ceramic and glass heat-resistant roving.

5. The airbag inflation filter of claim 4 wherein the ceramic yarn is continuous-filament texturized yarn that has a core from which fiber segments and loops of continuous filaments project outwardly.

6. The airbag inflation filter of claim 1 wherein the support tube is selected from the group consisting of a tube formed with shaped openings, tubular wire screen and tubular expanded metal.

7. The airbag inflation filter of claim 1 wherein the perforations through the support tube are generally uniformly spaced.

8. The airbag inflation filter of claim 1 wherein the perforations through the support tube are generally uniform in size.

9. The airbag inflation filter of claim 1 wherein the support tube is high-heat tolerant, and is selected from the group consisting of a metal tube and a ceramic tube.

10. The airbag inflation filter of claim 1 wherein the strand is helically cross-wound around the support tube.

11. The airbag inflation filter of claim 1 wherein the strand has a core from which filaments or fiber segments project outwardly, and wherein successive convolutions are oppositely wound in each layer to provide interwoven cores.

12. The airbag inflation filter of claim 11 wherein the cores of convolutions of each layer are spaced to afford substantially uniform four-sided openings within which at least one of the projecting filaments or fiber segments intermesh to form particulate traps.

13. The airbag inflation filter of claim 12 wherein the cores of convolutions of at least one layer are laterally offset from cores of convolutions of an adjacent layer to deflect generally radial airflow through the filtering element into tortuous paths therethrough.

14. The airbag inflation filter of claim 11 wherein the cores of successive convolutions of each successive layer are radially aligned to provide walls that are spaced to define four-sided openings within which at least one of the projecting filaments or fiber segments intermesh to form particulate traps.

15. The airbag inflation filter of claim 11 wherein the filtering element has at least two layers, and the amount of projecting filaments or fiber segments is less in a first layer closer to the support tube than in a second layer spaced further therefrom.

16. The airbag inflation filter of claim 1 wherein the perforations are aligned in a perforated area of the support tube, and wherein the perforations occupy in the range of from about 20 to about 70 percent of the support tube perforated area.

17. The airbag inflation filter of claim 1 wherein the filtering element has an annular thickness of from about 1 to 15 mm.

18. The airbag inflation filter of claim 1, and further comprising:
one or more layers of material about the support tube, selected from the group consisting of metal mesh, metal wool, ceramic or glass fabric, ceramic or glass nonwoven, ceramic or glass paper, helically wound high strength organic fibers, and helically wound metal wires, and combinations thereof.

19. The airbag inflation filter of claim 1 wherein the filtering element has at least two layers, and wherein the convolutions of the two layers are wound at different angles relative to the axis of the support tube.

20. An airbag inflator assembly comprising:
a housing having walls defining a chamber for reception of an airbag inflation filter according to claim 1 therein;
solid gas-generating material disposed within the support tube of the airbag inflation filter; and
means for activating the solid gas-generating material to generate airbag inflation gas therefrom, wherein the walls have defined openings therethrough for directing the flow of the airbag inflation gas out of the housing.

21. The airbag inflation filter of claim 1, consisting essentially of the support tube, the filtering element and the diffusion layer.

22. An airbag inflation filter comprising:
a substantially rigid support tube having gas permeable perforations therethrough; and
a filtering element formed from a continuous inorganic strand that is helically wound around the support tube to form a plurality of layers covering the perforations through the support tube, wherein each convolution of strand in a particular layer extends at a winding angle relative to the axis of the support tube, with the convolutions of an outer layer having a winding angle smaller than the convolutions of a previously wound inner layer, the inner layer having a convolution winding angle of about 80 degrees, and the outer layer having a convolution winding angle of about 50 degrees.

23. The airbag inflation filter of claim 22 wherein the filtering element has a second inner layer wound previously of the outer layer, with the convolutions of the second inner layer having a winding angle larger than the convolutions of the outer layer.

24. The airbag inflation filter of claim 22 wherein the outer layer is a first outer layer, and the filtering element has a second outer layer wound subsequently to the first outer layer, with the convolutions of the second outer layer having a winding angle larger than the convolutions of the first outer layer.

25. The airbag inflation filter of claim 22 wherein the inner layer is a first inner layer and the outer layer is a first outer layer, and wherein the filtering element has a second inner layer wound previously of the first outer layer and a second outer layer wound subsequently to the first outer layer, with the convolutions of the second inner and second outer layers having respective winding angles larger than the convolutions of the first outer layer.

26. The airbag inflation filter of claim 25 wherein the first inner layer has a convolution winding angle of about 80 degrees, the second inner layer has a convolution winding angle of about 80 degrees, the first outer layer has a convolution winding angle of about 50 degrees, and the second outer layer has a convolution winding angle of about 80 degrees.

27. A method of forming an airbag inflation filter assembly comprising the steps of:
providing a substantially rigid support tube having perforations therethrough, the support tube defining an axis;
helically winding over the perforations on the support tube a first layer of convolutions of a continuous inorganic strand having a core from which filaments or fiber segments project outwardly, successive convolutions being oppositely wound in each layer to provide interwoven cores, with cores of adjacent convolutions being substantially uniformly spaced to define four-sided openings within which projecting filaments or fiber segments intermesh to form particulate traps; and
helically winding over the first layer a second layer of the continuous inorganic strand, the cores of which define similar openings bridged by similar traps, each convolution of strand in at least one of the first layer and the second layer being wound at from about 75 degrees to about 85 degrees to the axis of the support tube.

28. The method of claim 27, and further comprising the step of:

offsetting the cores of the second layer from the cores of the first layer to thus deflect into tortuous paths airbag inflation gas flowing generally radially through the airbag inflator assembly.

29. The method of claim 28 and further comprising the step of:

aligning the cores of the second layer radial with the cores of the first layers to together form generally radially disposed walls and to form generally radially disposed particulate traps.

30. The method of claim 27 wherein the convolutions of the first layer are wound at a first angle relative to the axis of the support tube, and further comprising:

winding the convolutions of the second layer at a second, different angle relative to the axis of the support tube.

31. The method of claim 30, and further comprising:

winding the convolutions of the second layer at a second, smaller angle than the first angle.

32. The method of claim 30, and further comprising:

helically winding over the second layer a third layer of continuous inorganic strand, the cores of which define openings bridged by similar traps, wherein the convolutions of the third layer are wound at a third, larger angle than the second angle.

* * * * *

UNITED STATES PATENT AND TRADEMARK OFFICE
CERTIFICATE OF CORRECTION

PATENT NO.: 5,702,494

DATED: December 30, 1997

INVENTOR(S): Thomas L. Tompkins et al.

It is certified that error appears in the above-identified patent and that said Letters Patent is hereby corrected as shown below:

Col. 6, line 47, "Owens-Coming" should be -- Owens-Corning --.

Col. 13, line 32, "wails" should be -- walls --.

Signed and Sealed this

Twenty-first Day of April, 1998

Attest:

BRUCE LEHMAN

Attesting Officer

Commissioner of Patents and Trademarks